US012529263B2

(12) United States Patent

Moss et al.

(10) Patent No.: US 12,529,263 B2
(45) Date of Patent: Jan. 20, 2026

(54) LADDERS AND LADDER RUNGS

(71) Applicant: LITTLE GIANT LADDER SYSTEMS, LLC, Springville, UT (US)

(72) Inventors: N. Ryan Moss, Mapleton, UT (US); Steven S. Miner, Springville, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 1082 days.

(21) Appl. No.: 17/152,553

(22) Filed: Jan. 19, 2021

(65) Prior Publication Data

US 2021/0222492 A1 Jul. 22, 2021

Related U.S. Application Data

(60) Provisional application No. 62/963,408, filed on Jan. 20, 2020.

(51) Int. Cl.
*E06C 7/08* (2006.01)
*E06C 1/20* (2006.01)

(52) U.S. Cl.
CPC .................. *E06C 7/08* (2013.01); *E06C 1/20* (2013.01); *E06C 7/081* (2013.01); *E06C 7/082* (2013.01)

(58) Field of Classification Search
CPC . E06C 7/08; E06C 7/081; E06C 7/082; E06C 7/083; E06C 7/084; E06C 7/087;
(Continued)

(56) References Cited

U.S. PATENT DOCUMENTS 1,820,315 A * 8/1931 Miller ..................... E06C 7/165 182/152
2,488,633 A * 11/1949 Linder .................... E06C 7/165 182/120

(Continued)

FOREIGN PATENT DOCUMENTS

CN 203308369 U 11/2013
CN 107250479 A 10/2017

(Continued)

OTHER PUBLICATIONS

International Search Report and Written Opinion of International Application No. PCT/US2021/014184, mailed Mar. 29, 2021.

(Continued)

*Primary Examiner* — Colleen M Chavchavadze
*Assistant Examiner* — Shiref M Mekhaeil
(74) *Attorney, Agent, or Firm* — Dorsey & Whitney, LLP

(57) ABSTRACT

A ladder and ladder rungs are provided. In one embodiment, a ladder comprises a first assembly having a first pair of spaced apart rails and a plurality of rungs extending between and coupled to the first pair of spaced apart rails. At least one rung of the plurality of rungs may include a first support surface portion, a second support surface portion, and a channel extending between the first support surface portion and the second support surface portion. In one embodiment, a rear surface of each of the first pair of spaced apart rails defines a plane and the first support surface portion is located on a first side of the plane and the second support surface portion is located on a second side of the plane. In one embodiment, at least one other rung is entirely positioned on the first side of the plane.

21 Claims, 6 Drawing Sheets

(58) Field of Classification Search
CPC ..... E06C 1/14; E06C 1/16; E06C 1/18; E06C 1/20; E06C 1/38; E06C 1/387; E06C 1/383; E06C 1/3835; E06C 1/393
See application file for complete search history.

(56) References Cited

U.S. PATENT DOCUMENTS

| | | | | | |
|---|---|---|---|---|---|
| 2,509,206 | A * | 5/1950 | Buckner | E06C 1/36 | 182/156 |
| 3,002,582 | A * | 10/1961 | Marcelis | E06C 7/085 | 29/523 |
| 3,016,976 | A * | 1/1962 | Munson | E06C 7/08 | 182/228.1 |
| 3,085,652 | A * | 4/1963 | Rich | E06C 7/08 | 182/216 |
| 4,332,308 | A * | 6/1982 | Larson | E06C 7/16 | 182/120 |
| 4,406,048 | A * | 9/1983 | Bailey | B21D 39/063 | 29/523 |
| 4,974,701 | A * | 12/1990 | Parise | E06C 1/32 | 182/194 |
| 5,056,620 | A * | 10/1991 | Zumwalt | E06C 7/165 | 182/120 |
| 5,337,857 | A * | 8/1994 | Spalt | E06C 7/165 | 182/120 |
| 5,779,208 | A * | 7/1998 | McGraw | E06C 7/165 | 182/120 |
| 6,786,300 | B1 * | 9/2004 | Bonifacini | E06C 7/165 | 182/120 |
| 8,186,481 | B2 | 5/2012 | Moss et al. | | |
| 8,657,070 | B2 * | 2/2014 | O'Brien | E06C 7/165 | 182/120 |
| 8,727,074 | B1 * | 5/2014 | Bhajan | E06C 7/165 | 182/120 |
| D766,461 | S * | 9/2016 | Moss | D25/64 | |
| 10,012,022 | B1 * | 7/2018 | Stentiford, Sr. | E06C 7/16 | |
| 10,352,098 | B2 * | 7/2019 | Frensley | E06C 7/165 | |
| 10,487,579 | B2 * | 11/2019 | Rodriguez | E06C 7/084 | |
| 10,538,966 | B2 * | 1/2020 | Woodward | E04F 11/112 | |
| 11,142,950 | B2 * | 10/2021 | Miller | E06C 7/165 | |
| 11,274,495 | B2 * | 3/2022 | Garay | E06C 7/165 | |
| 11,788,351 | B2 * | 10/2023 | Moss | E06C 7/04 | 182/104 |
| 2003/0057019 | A1 * | 3/2003 | Schmitt | E06C 5/44 | 182/165 |
| 2004/0163890 | A1 | 8/2004 | Nash | | |
| 2007/0120028 | A1 * | 5/2007 | Kane | E06C 7/14 | 248/210 |
| 2014/0224585 | A1 * | 8/2014 | Russell | E06C 1/18 | 182/180.1 |
| 2015/0090533 | A1 * | 4/2015 | Moss | E06C 7/14 | 182/180.1 |
| 2017/0167198 | A1 * | 6/2017 | Goodnow | E06C 7/16 | |
| 2018/0163467 | A1 * | 6/2018 | Parker | E06C 1/383 | |
| 2019/0063073 | A1 * | 2/2019 | Woodward | E04F 11/104 | |
| 2019/0100964 | A1 * | 4/2019 | Moss | E06C 1/397 | |
| 2019/0145171 | A1 * | 5/2019 | Frensley | E06C 7/165 | 182/120 |
| 2019/0186202 | A1 | 6/2019 | Rodriguez | | |
| 2019/0376341 | A1 * | 12/2019 | Maxfield | F16C 11/10 | |
| 2020/0032585 | A1 * | 1/2020 | Clark | E06C 7/08 | |
| 2020/0131850 | A1 * | 4/2020 | Wernberg | E06C 7/42 | |
| 2020/0378183 | A1 * | 12/2020 | Zhu | E06C 7/083 | |
| 2023/0313612 | A1 * | 10/2023 | Major | E06C 7/14 | 182/13 |

FOREIGN PATENT DOCUMENTS

| | | |
|---|---|---|
| DE | 202006013489 U1 | 11/2006 |
| EP | 3246509 B1 | 1/2019 |
| KR | 200146389 Y1 | 6/1999 |

OTHER PUBLICATIONS

First Office Action for Chinese Patent Application No. 202180015313.2, mailed Feb. 29, 2024 (7 pages).
Search Report for Chinese Patent Application No. 202180015313.2, mailed Feb. 29, 2024 (3 pages).
Search Report, Chinese Patent Application No. 202180015313.2, dated Sep. 30, 2024.

* cited by examiner

LADDERS AND LADDER RUNGS

CROSS-REFERENCE TO RELATED APPLICATIONS

The present application claims the benefit of U.S. Provisional Patent Application No. 62/963,408, entitled LADDERS AND LADDER RUNGS, filed on Jan. 20, 2020, the disclosure of which is incorporated by reference herein in its entirety.

BACKGROUND

The present disclosure relates generally to ladders and ladder rungs. Ladders are conventionally utilized to provide a user thereof with improved access to elevated locations that might otherwise be inaccessible. Ladders come in many shapes and sizes, such as straight ladders, straight extension ladders, step ladders, and combination step and extension ladders. So-called combination ladders may incorporate, in a single ladder, many of the benefits of multiple ladder designs.

In all types of ladders, it can be desirable to provide a natural and consistent climbing experience for the user, and also to provide substantial support by the rungs for a comfortable standing or climbing experience. Such characteristics can help a user in terms of potential fatigue as well as safety.

SUMMARY OF THE DISCLOSURE

The present disclosure describes embodiments of ladders, ladder rungs and methods of fabricating a ladder. In one embodiment, a ladder is provided that includes a first pair of spaced apart rails and a plurality of rungs extending between and coupled to the first pair of spaced apart rails. At least one rung of the plurality of rungs includes a first support surface portion, a second support surface portion, and a channel extending between the first support surface portion and the second support surface portion.

In one embodiment, a rear surface of each of the first pair of spaced apart rails defines a plane, and wherein the first support surface portion is located on a first side of the plane and the second support surface portion is located on a second side of the plane.

In one embodiment, first support surface portion exhibits a first depth, the channel exhibits a second depth, and the second support surface portion exhibits a third depth.

In one embodiment, at least one other rung is entirely positioned on the first side of the plane.

In one embodiment, the at least one other rung includes a support surface portion exhibits a depth that is equal to the first depth.

In one embodiment, the ladder further comprises a second assembly comprising at least one rail pivotally coupled with the first assembly and a top cap coupled to the first assembly.

In one embodiment, the at least one rung of the plurality of rungs includes at least two rungs positioned immediately adjacent to each other.

In one embodiment, each of the plurality of rungs includes a first support surface portion, a second support surface portion, and a channel extending between the first support surface portion and the second support surface portion.

In one embodiment, the channel exhibits a height of at least on 0.5 inch and a depth of at least 0.5 inch.

In one embodiment, the first depth is between approximately 2.5 inches and approximately 3.5 inches, wherein the second depth is between approximately 0.5 inch and approximately 1.0 inch, and the third depth is between approximately 1.5 inches and approximately 2.5 inches.

In accordance with another embodiment of the present disclosure, a rung for a ladder is provided, the rung comprising a first support surface portion, a second support surface portion, and a channel extending between the first support surface portion and the second support surface portion.

In one embodiment, a first wall of the channel defines a plane, and wherein the first support surface portion is located on a first side of the plane and the second support surface portion is located on a second side of the plane.

In one embodiment, first support surface portion exhibits a first depth, the channel exhibits a second depth, and the second support surface portion exhibits a third depth.

In one embodiment, the first depth is between approximately 2.5 inches and approximately 3.5 inches, wherein the second depth is between approximately 0.5 inch and approximately 1.0 inch, and the third depth is between approximately 1.5 inches and approximately 2.5 inches.

In one embodiment, the channel exhibits a depth of at least approximately 0.5 inch and a height of at least one 0.5 inch.

In one embodiment, the channel extends substantially parallel to a front edge of the rung. In one embodiment, wherein rung is formed as a unitary member.

Features, elements and aspects of on embodiment may be combined with features, elements or aspects of other embodiments without limitation.

BRIEF DESCRIPTION OF THE DRAWINGS

The foregoing and other advantages of the invention will become apparent upon reading the following detailed description and upon reference to the drawings in which.

DETAILED DESCRIPTION

Various embodiments of ladders and ladder components are described herein. The described embodiments are not mutually exclusive of each other. Rather, various features of one described embodiment may be used in conjunction with features of other described embodiments.

Figure 1:
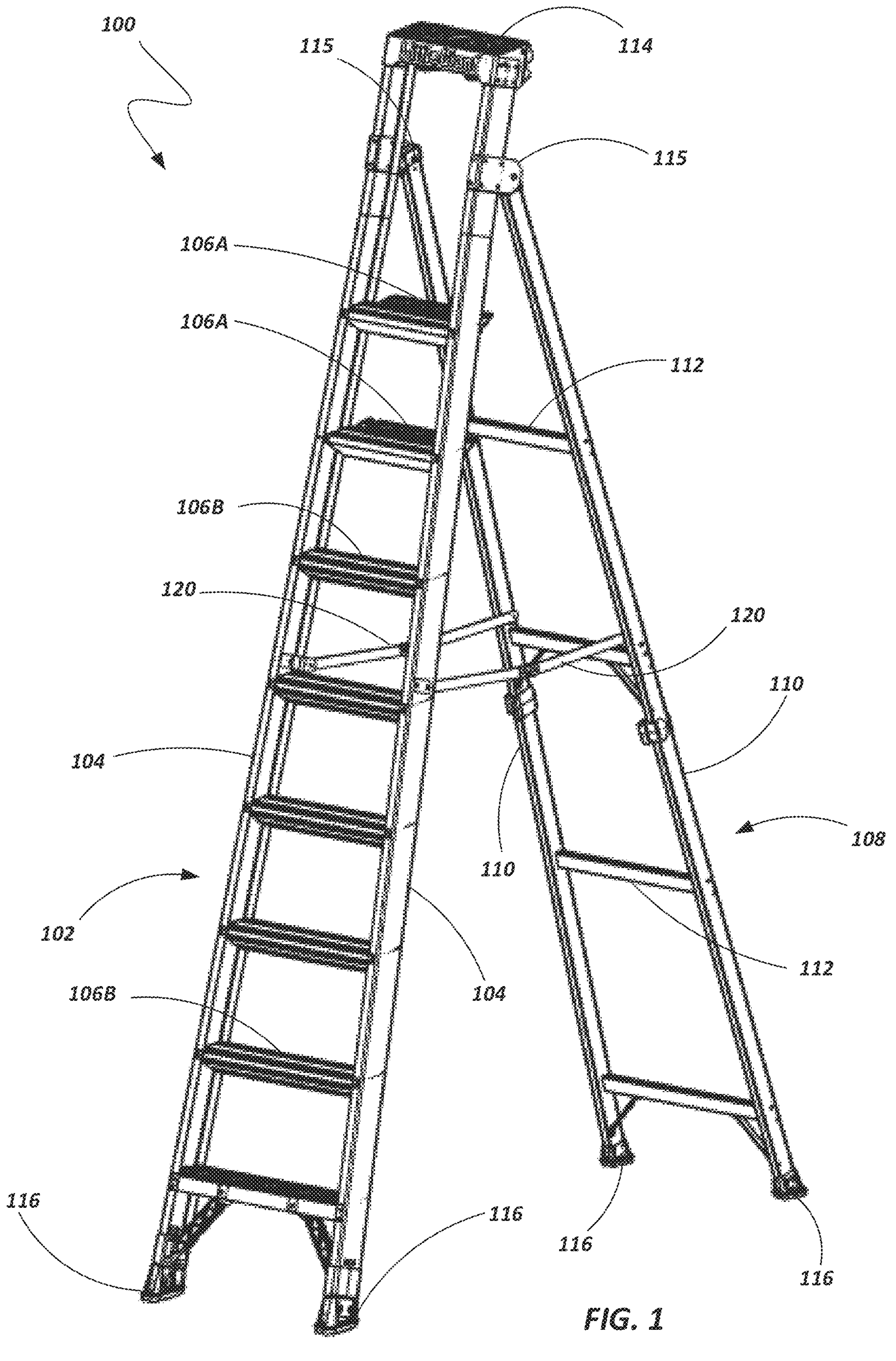
FIG. 1 is a perspective view of a step ladder according to an embodiment of the present invention.
Figure 2:
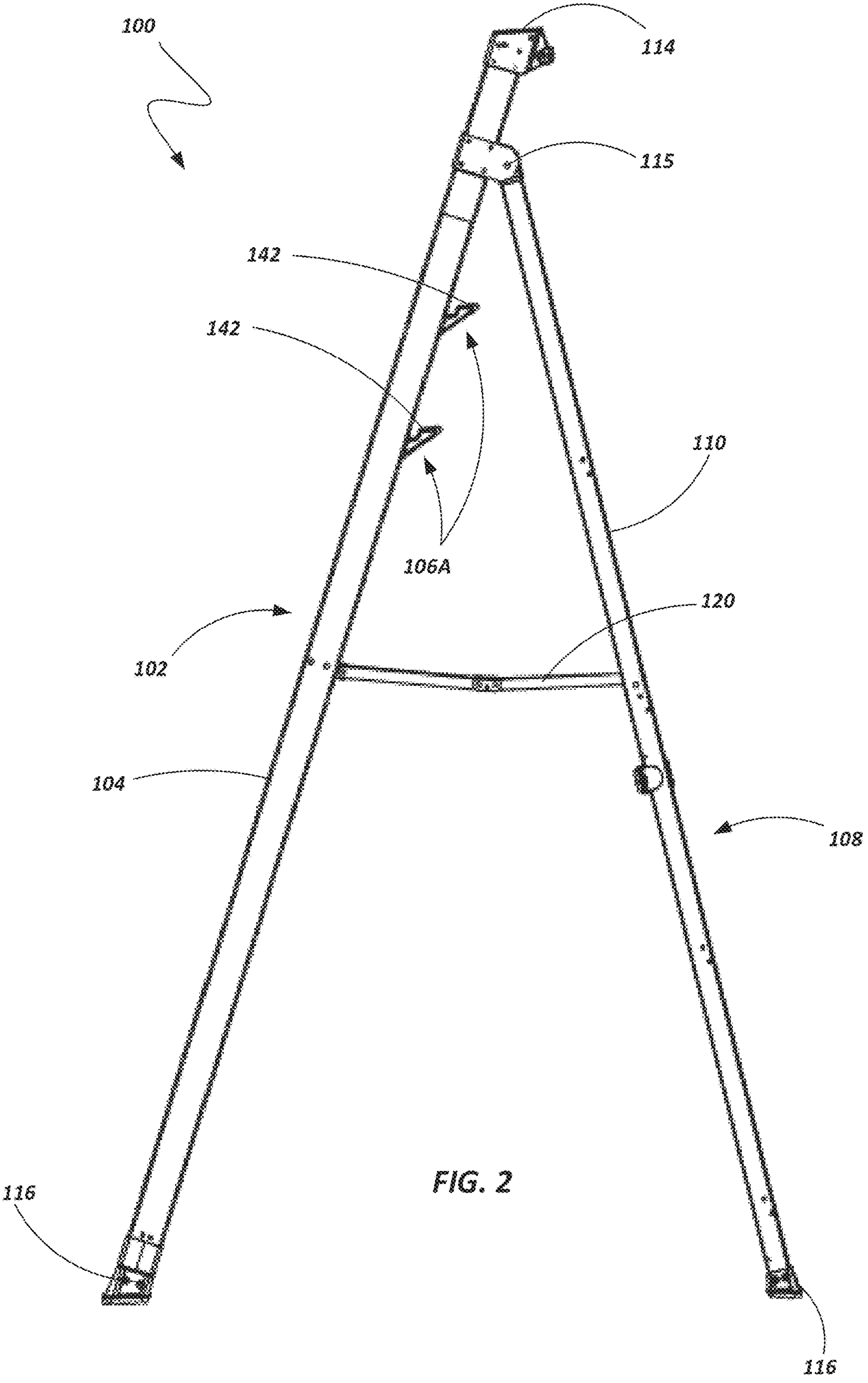
FIG. 2 is a side view of the step ladder shown in FIG. 1.

Referring to FIGS. 1 and 2, a stepladder 100 is shown in accordance with an embodiment of the present invention. The stepladder 100 includes a first assembly 102 having a pair of spaced apart rails 104 and a plurality of rungs 106 extending between, and coupled to, the rails 104. The spaced apart rungs 106 are substantially parallel to one another and are configured to be substantially level when the stepladder 100 is in an orientation for intended use so that the rungs 106 may be used as "steps" for a user to ascend the stepladder 100 as will be appreciated by those of ordinary skill in the art. In various embodiments, the upper surface of the rungs (generally denoted as 106) may include traction features (e.g., grooves and ridges, grip tape or other anti-slip features) to provide a traction to a user while standing on the rungs 106. In the embodiment shown in FIGS. 1 and 2, two different types of rungs 106A and 106B are utilized as will described in further detail below.

The stepladder 100 also includes a second assembly 108 having a pair of spaced apart rails 110. In the embodiment shown, a plurality of cross-braces 112 extend between, and are coupled to, the spaced apart rails 110. The cross-braces 112 provide a desired level of strength and rigidity to the second assembly 108, but they are not configured as rungs (i.e., they are not intended to support a user). Thus, the second assembly 108 as shown in FIGS. 1-5 does not include a plurality of rungs between the spaced apart rails 110. However, in some embodiments, the second assembly 108 may include rungs configured generally similar to those associated with the first assembly 102. The second assembly 108 is used to help support the stepladder 100 when spaced apart from the first assembly 102 and when the ladder 100 is in an intended operational state, such as depicted in FIGS. 1 and 2. Additionally, while not specifically numbered in the drawings, it is noted that the ladder 100 may include various bracing and support members (e.g., extending between rails and associated rungs) to help provide desired strength and stability.

In the embodiment shown in FIGS. 1 and 2, the rails 104 of the first assembly 102 may be coupled with the rails 110 of the second assembly 108 by way of hinges 115. The hinges 115 may enable in the first assembly 102 and the second assembly 108 to pivot relative to one another so that the ladder 100 may be collapsed into a stowed or a stored state, and then expanded into a usable state such as shown in FIGS. 1 and 2.

The first and second assemblies 102 and 108 may be formed of a variety of materials and using a variety of manufacturing techniques. For example, in one embodiment, the rails 104 and 110 may be formed of a composite material, such as fiberglass, while the rungs and other structural components may be formed of aluminum or an aluminum alloy. In other embodiments, the assemblies 102 and 108 (and their various components) may be formed of other materials including other composites, plastics, polymers, metals and metal alloys.

A top cap 114 is coupled to the rails 104 of the first assembly 102. In one embodiment, the top cap 114 may simply be a structural component configured to facilitate relative coupling of the rails 104 of the first assembly 102. In other embodiments, the top cap 114 may include features that enable it to be used as a tray or a tool holder. Thus, the top cap 114 may be used to organize a user's tools and resources while working on the stepladder 100. For example, such a top cap is described in U.S. Pat. No. 8,186,481 issued May 29, 2012 and entitled LADDERS, LADDER COMPONENTS AND RELATED METHODS, the disclosure of which is incorporated by reference herein in its entirety. It is noted that, in the embodiment shown and described with respect to FIGS. 1 and 2, for safety purposes, the top cap 114 is not conventionally configured as a "rung" or a "step" and is not intended to support a user's standing weight. However, in other types of ladders, including for example, those described in U.S. patent application Ser. No. 16/435,183 filed on Jun. 7, 2019, and published as U.S. Patent Publication No. 2019/0376341 (the entire disclosure of which is incorporated by reference herein) may include a top cap that is configured for a user to stand on during use of the ladder.

As with other components of the stepladder 100, the top cap 114 may be formed from a variety of materials. In one embodiment, the top cap 114 may be formed from a plastic material that is molded into a desired size and shape. Of course other materials and manufacturing processes are also contemplated.

The step ladder 100 may additionally include a plurality of feet 116 (one associated with each rail) configured to engage a supporting surface such as the ground. The feet 116 may be configured in a variety of manners based on, for example, the type of environment in which the ladder is anticipated to be used. For example, the feet 116 may be formed of a plastic or polymer material and be configured with a plurality of ridges, knobs or other engagement features configured to provide increased friction between the ladder and a relatively rigid supporting surface (e.g., concrete, tile or wood). Additionally, or alternatively, the feet 116 may include features such as barbs or other sharp protrusions configured to dig into a relatively softer supporting surface (e.g., dirt or grass).

A pair of hinged or foldable braces, referred to herein as spreaders 120, can also be used to provide added stabilization and maintain a desired angle between the first and second assemblies 102 and 108 when the stepladder 100 is in a deployed or useable state. The hinged nature of such spreaders 120 helps to enable the first and second assemblies 102 and 108 to collapse into a stored state and then lock the assemblies 102 and 108 in position relative to one another when in a deployed or useable state. It is noted that in the embodiment shown in FIGS. 1 and 2, the spreaders 120 are not configured as rungs or platforms, and are not otherwise configured to support a user standing thereon. Rather, the spreaders 120 are simply configured to structurally maintain the ladder 100 in a deployed position while enabling the rail assemblies 102 and 108 to be selectively collapsed relative to each other for storage and transportation of the ladder 100.

As seen in FIGS. 1 and 2, the first type of rung 106A may include a portion that extends beyond the rear surfaces 122 of the rails 104 of the first assembly 102. Stated another way, the rear surfaces 122 of the rails 104 may define a plane, and a portion of the rungs 106A may extend beyond that plane toward the second assembly 108. The extended portions of these rungs 106A provide an enlarged surface area on which a user may stand while using the ladder 100. As also seen in FIGS. 1 and 2, the first type of rung 106A, despite extending beyond the rear surfaces 122 of the front rails 104, do not directly engage or contact any portion of the second assembly 108 or the spreader mechanisms 120 when the ladder 100 is in a deployed state.

In some embodiments, such as shown in FIGS. 1 and 2, the second type of rung 106B may include rungs that do not have a portion extending beyond the rear surfaces of the rails 104. Such rungs 106B may have a depth that is equal to, or less than, a depth of the associated rails 104 as can be seen best in FIG. 2.

In some embodiments, the rungs 106 of the ladder 100 can be configured in a specific manner to minimize potential safety risks to a user of the ladder 100. For example, the rungs can be spaced and arranged such that there is a substantial space between the uppermost rung 106A and the top cap 114, discouraging and inhibiting a user from climbing on to the top cap 114. Examples of such a configuration are described in U.S. Patent Publication No. US2015/0090533 filed on Sep. 25, 2014, the disclosure of which is incorporated by reference herein in its entirety.

Figure 3:
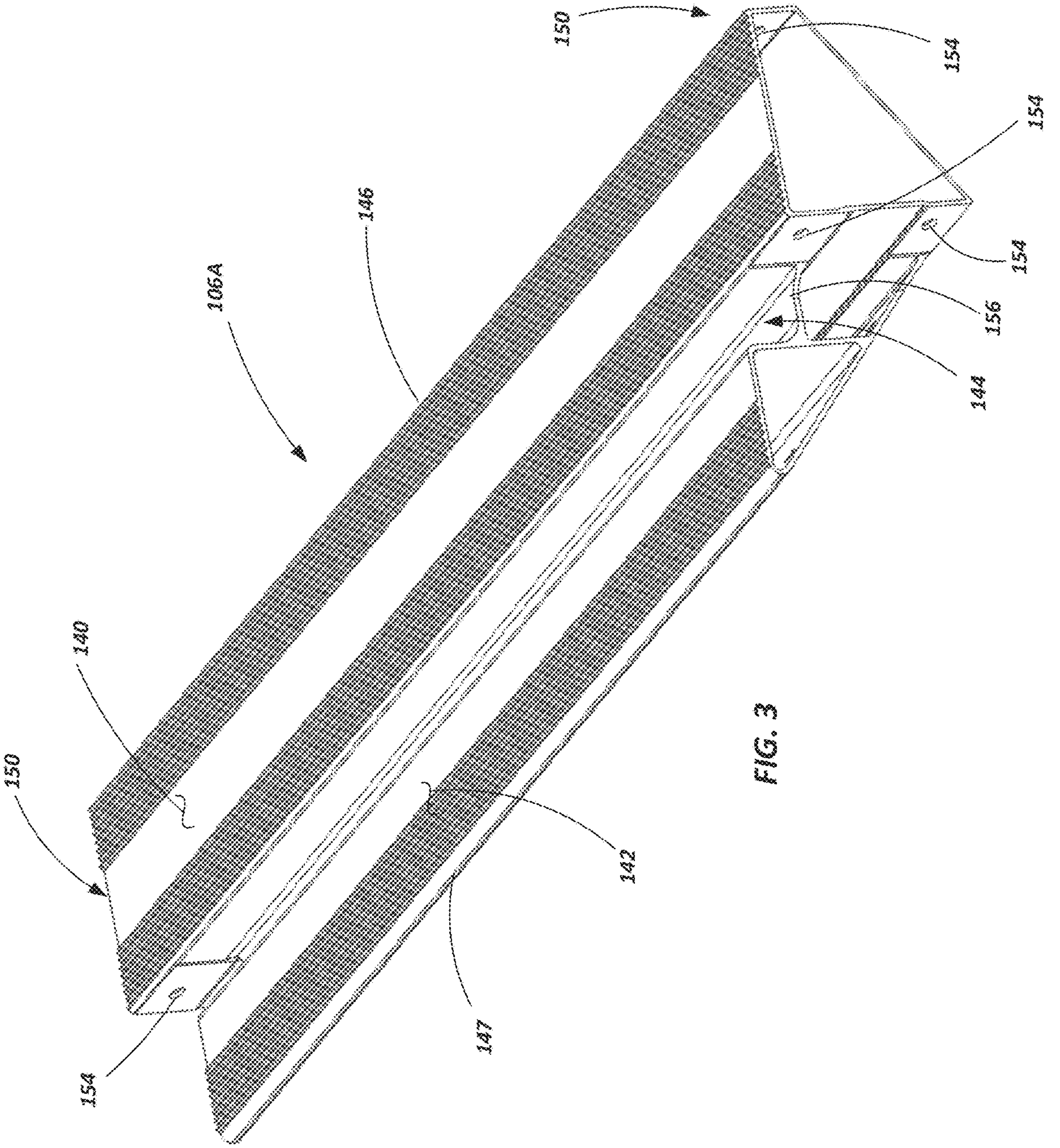
FIGS. 3 and 4 are rear and front perspective views, respectively, of a rung used in the ladder of FIG. 1.
Figure 4:
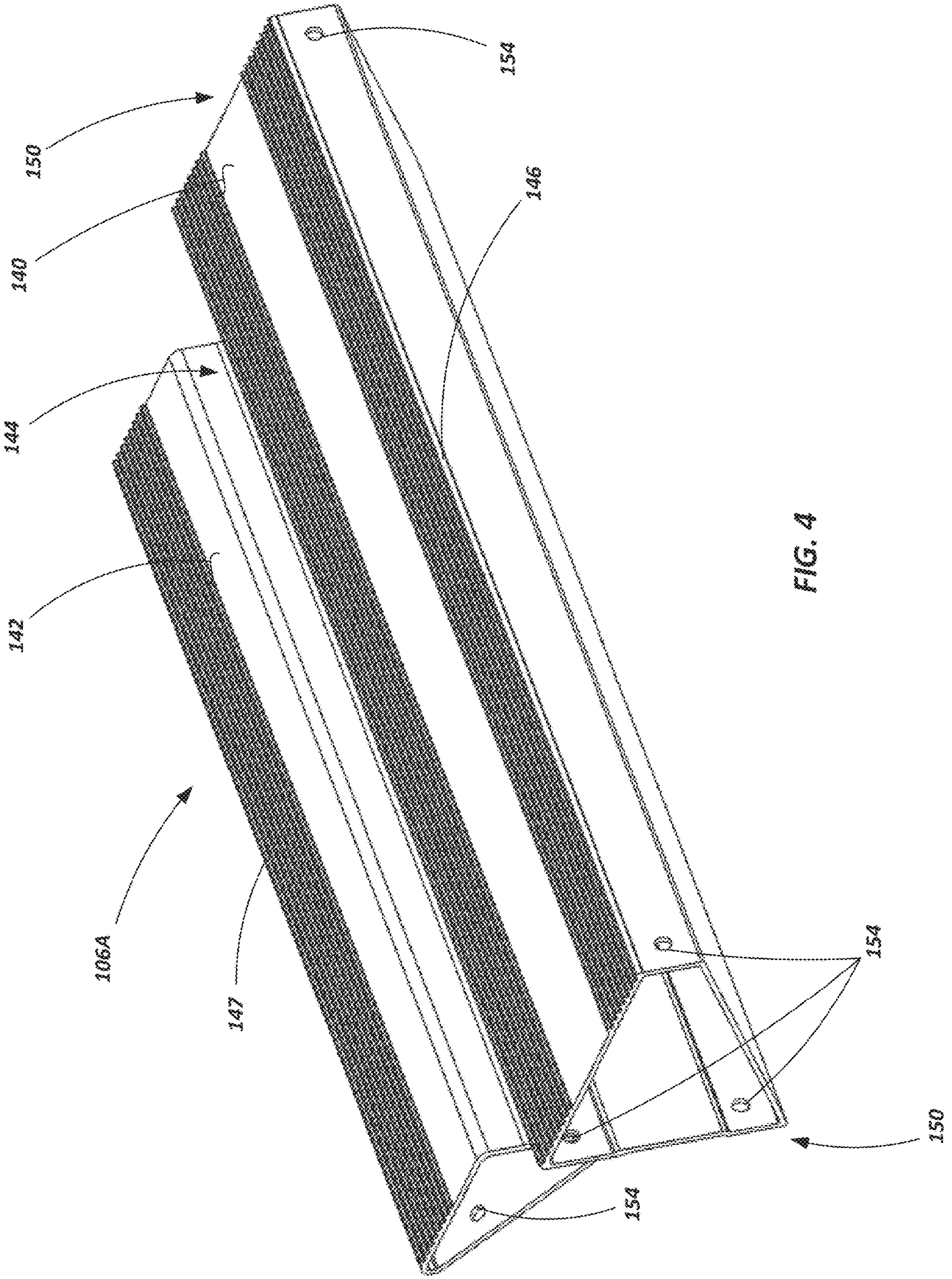
Figure 5:
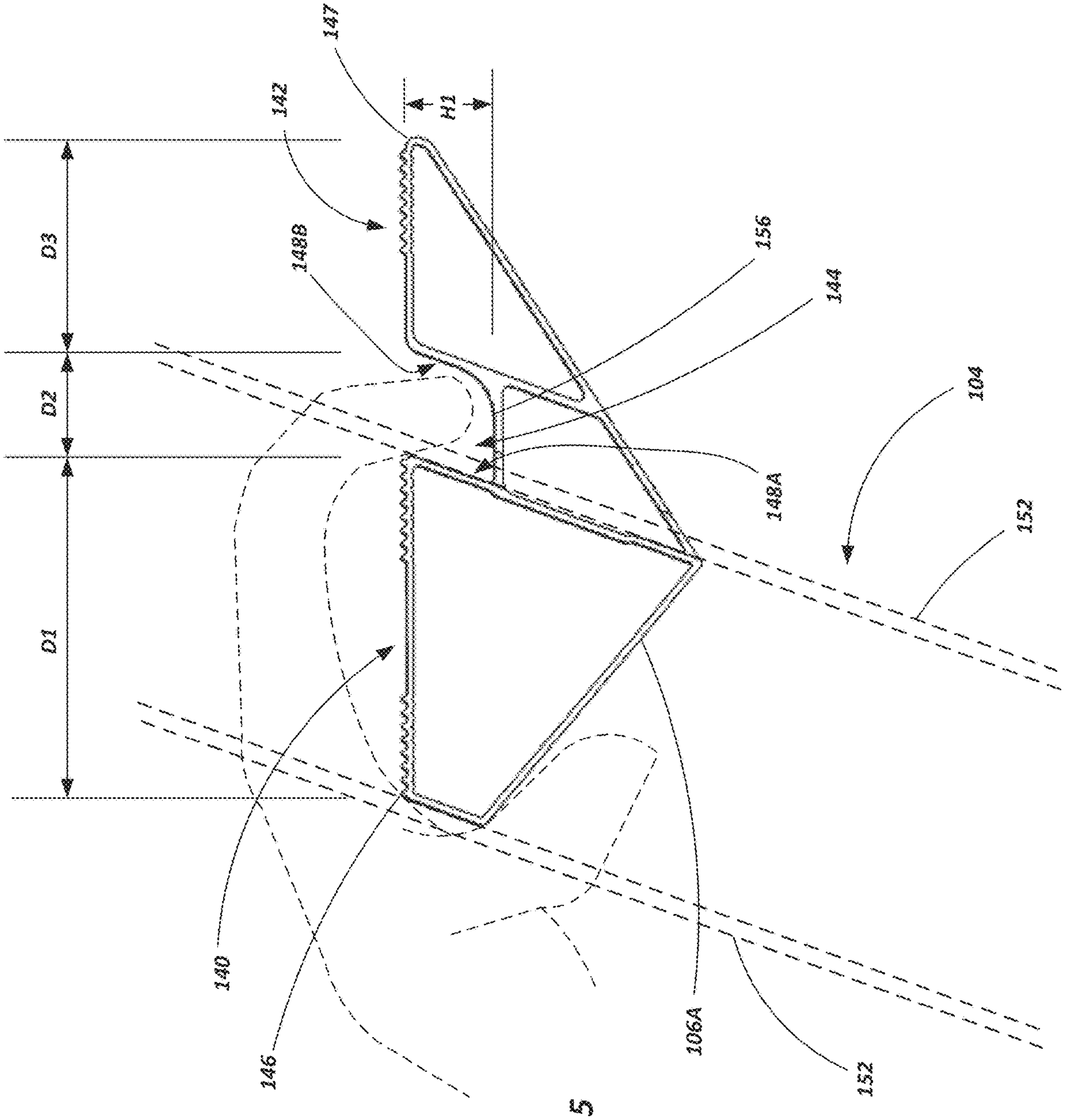
FIG. 5 is a side view of the rung shown in FIGS. 3 and 4.

Referring to FIGS. 3-5, an embodiment of the first type of rung 106A is shown. The rung includes a first support surface portion 140, a second support surface portion 142, and a channel 144 positioned between the first and second support surface portions 140 and 142. In one embodiment, the channel 142 may extend substantially parallel to the front edge 146 of the rung 106A and/or the rear edge 148 of the rung 106A. Additionally, the channel 144 may include a pair walls 148A and 148B and a floor 156. Either of the walls 148A and 148B may define a plane, wherein the first surface portion 140 and the second surface portion 142 are on opposite sides of the plane.

As can be seen in FIG. 5, the first support surface portion 140 includes a depth "D1" that may be configured to fit within a channel portion of a rail 104 (e.g., as shown in dashed lines in FIG. 5). For example, the rail 104 may be configured with a cross-sectional profile of a C-channel, and the ends 150 of the first support surface portion 140 can be inserted or nested inside the hollow of the C-channel. Fasteners (e.g., screws, bolts, rivets, etc.) may be used to connect the first support surface portion 140 with flanges 152 of the rails 104 such as at locations indicated by the fastener openings 154 (see FIGS. 3 and 4). In other embodiments, the rungs 106A may be coupled with the rails 104 by other means, including adhesives, welding, or other appropriate joining or coupling techniques. Additionally, in other embodiments, the rung 106 need not be nested within a channel formed by the rail, but may be otherwise coupled with the rail.

As seen in FIGS. 3 and 4, the width of the first support surface portion 140 may be greater than the width of the second support surface portion 142 (with "width" being measured in a direction transverse to that of the "depth" direction). In one embodiment, this may account for the insertion of the ends of the first support surface portion 140 into the rails 104 of the first assembly 102. The width of the second support surface portion 142 may be, in some examples, at least 12 inches. In some embodiments, the width of the second support surface portion 142 may be 14 inches or greater. In the embodiment shown in FIGS. 1-5, the width of the second support surface portion 142 is substantially equal to the width of the first support surface portion 140 minus the twice the width of a rail 104, thereby providing a user with the sense that the usable width of the first and second surface portions 140 and 142 are substantially the same.

As shown in FIG. 5, the channel 144 formed in the rung 106 may have a depth D2, and the second support surface portion 142 may exhibit a depth of D3. Thus, the overall depth of the rung 106A may be equal to sum of the other depths (i.e., D1+D2+D3). It is noted, with reference to FIG. 6, that the second rung type (i.e., rung 106B) may have an overall depth substantially equal to D1 (i.e., substantially equal to the depth of the first surface portion 140 of the first type of rung 106A). It is noted that with respect to the rungs 106, the term "depth" is a distance measured in a direction that is substantially perpendicular to the front edge 146 or the front surface of the rung and parallel to the plane defined by the upper surface portion (e.g., the first upper surface portion 140 of rung 106A).

In one embodiment, D1 may be approximately 2.5 inches to approximately 3.5 inches, D2 may be approximately 0.5 of an inch to approximately 1 inch, and D3 may be approximately 1.5 inches to approximately 2.5 inches. However, such dimensions are merely intended as examples and are not to be considered limiting in any way.

The upper surfaces of the support surface portions 104 and 142 may be configured to be substantially coplanar such that a user's foot may extend from the first support surface portion 140, across the channel 144, and on to the second support surface portion 142, creating the sense that they are standing on a generally continual support surface. The channel 144 may also exhibit a height H1 that extends from a floor portion 156 of the channel to a plane extending through the upper surfaces of the support surface portions 140 and 142. In one embodiment, the height H1 of the channel 144 may be, for example, at least on 0.5 inch. In other embodiments, the height H1 of the channel 144 may be between approximately 0.5 inch and approximately 1.0 inch. In other embodiments, the height H1 of the channel 144 may be greater than 1.0 inch.

Referring back to FIGS. 1 and 2, the ladder 100 may include the second type of rungs 106B for several of the rungs (e.g., the lowermost rungs), while one or more of the uppermost rungs may be of the first type of rung 106A. However, other configurations, including only a single rung of the first type 106A, or all of the rungs being of the first rung type 106A, may be utilized.

Figure 6:
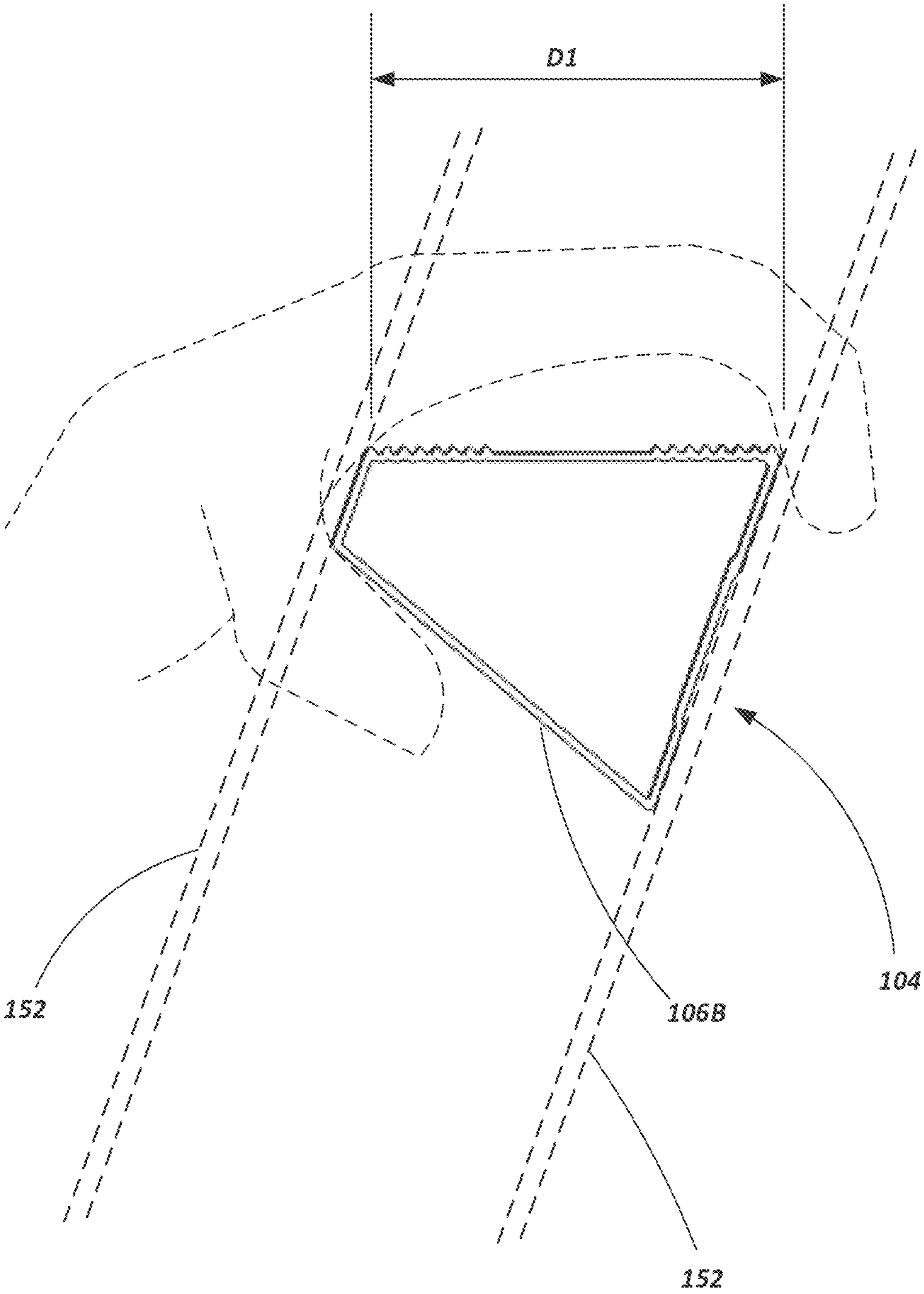
FIG. 6 is a side view of another rung that can be used in the ladder shown in FIG. 1.

A ladder 100 such as shown in FIGS. 1 and 2, including one or more rungs configured such as shown in FIGS. 3-5, provides various advantages. For example, the second support surface portion 142 that extends beyond the rear surfaces of the rails 104, providing additional surface area for a user to stand on. Thus, the first type of rung 106A may be used at least at a location where a user is expected to stand for an extended duration (e.g., the top-most rung, the top-most, two rungs, the lowermost rung, or the lowermost two rungs, etc.). Additionally, having a channel 144 formed within the rung between the two support surface portions 140 and 142, such as described herein, enables a user to have a climbing experience that is consistent throughout all of the rungs. For example, as a user climbs a ladder 100, their hand may grasp the rungs of the second rung type 106B in a manner such as shown as seen in FIG. 6 (see hand depicted in dashed lines). As the user grasps a rung of the first type of rung 106A, because of the channel 144 formed in the rung 106B, a user's hand perceives the rung 106Ato be the same type of rung as the second type of rung 106B (see the user's hand also depicted by dashed lines in FIG. 5). Thus, a user does not perceive a difference when climbing between grasping one type of rung (e.g., 106B) or the other type of rung (e.g., 106A), providing a consistent climbing experience for the user.

As previously noted, the channel 144 may exhibit a depth D2 that accommodates the fingers of a user's hand. Thus, for example, in one embodiment, the channel may exhibit a depth D2 of at least 0.5 inch. In one embodiment, the channel 144 may exhibit a depth D2 of between approximately 0.5 inch and approximately 1.0 inch. In another embodiment, the channel 144 may exhibit a depth D2 of greater than 1.0 inch.

In some embodiments, the first type of rung 106A may be formed as a unitary member. For example, in one embodiment, the first type of rung 106A may be formed using an extrusion process. The rung 106A may be formed of a variety of materials including, for example, aluminum, aluminum alloys, other metals, plastic materials, and composite materials.

While the invention may be susceptible to various modifications and alternative forms, specific embodiments have been shown by way of example in the drawings and have been described in detail herein. However, it should be understood that the invention is not intended to be limited to the particular forms disclosed. Additionally, features of one embodiment may be combined with features of other embodiments without limitation. The invention includes all modifications, equivalents, and alternatives falling within the spirit and scope of the invention as defined by the following appended claims.

What is claimed is:

1. A ladder comprising:
a first assembly comprising:
a pair of spaced apart rails, wherein a rail depth is defined between a frontmost surface and a rearmost surface of at least one rail of the pair of spaced apart rails; and
a plurality of rungs extending between and coupled to the pair of spaced apart rails, wherein at least one rung of the plurality of rungs includes:
a first support surface portion having a first depth positioned in the rail depth,
a second support surface portion entirely external to the rail depth, and
a channel extending between and connecting the first support surface portion and the second support surface portion, at least partially positioned external to the rail depth, and defining an upward-facing opening between the first support surface portion and the second support surface portion, wherein the channel is configured to allow insertion of a substantial portion of a distal phalanx of a user's hand to allow grasping the at least one rung.

2. The ladder of claim 1, wherein the channel exhibits a second depth, and the second support surface portion exhibits a third depth, wherein the first depth, the second depth, and the third depth are different.

3. The ladder of claim 2, wherein at least one other rung is entirely positioned in the rail depth.

4. The ladder of claim 3, wherein the at least one other rung includes a support surface portion exhibiting a depth equal to the first depth.

5. The ladder of claim 1, further comprising:
a second assembly comprising at least one rail pivotally coupled with the first assembly;
a top cap coupled to the first assembly.

6. The ladder of claim 1, wherein the at least one rung of the plurality of rungs includes at least two rungs positioned immediately adjacent to each other.

7. The ladder of claim 1, wherein each of the plurality of rungs includes a respective first support surface portion, a respective second support surface portion, and a respective channel extending between the respective first support surface portion and the respective second support surface portion.

8. The ladder of claim 1, wherein the channel exhibits a height of at least 0.5 inch and a depth of at least 0.5 inch.

9. The ladder of claim 1, wherein the first depth is between approximately 2.5 inches and approximately 3.5 inches, wherein a second depth of the channel is between approximately 0.5 inch and approximately 1.0 inch, and wherein a third depth of the second support surface portion is between approximately 1.5 inches and approximately 2.5 inches.

10. A rung for a ladder, the rung comprising:
a first support surface portion;
a second support surface portion; and
a channel extending between the first support surface portion and the second support surface portion, wherein a first wall of the channel is planar, directly adjoins and extends below the first support surface portion, and is non-perpendicularly angled relative to the first support surface portion, wherein the first wall defines a plane, one side of the plane faces the entire first support surface portion, and an opposite side of the plane faces the entire second support surface portion;
wherein the channel comprises a second wall, and the channel defines an upward-facing opening between the first wall and the second wall; and
wherein the channel is configured to allow insertion of a substantial portion of a distal phalanx of a user's hand to allow grasping the rung.

11. The rung of claim 10, wherein the first support surface portion exhibits a first depth, the channel exhibits a second depth, and the second support surface portion exhibits a third depth.

12. The rung of claim 11, wherein the first depth is between approximately 2.5 inches and approximately 3.5 inches, wherein the second depth is between approximately 0.5 inch and approximately 1.0 inch, and the third depth is between approximately 1.5 inches and approximately 2.5 inches.

13. The rung of claim 10, wherein the channel exhibits a depth of at least approximately 0.5 inch and a height of at least ene 0.5 inch.

14. The rung of claim 11, wherein the channel extends substantially parallel to a front edge of the rung.

15. The rung of claim 11, wherein the rung is formed as a unitary member.

16. The rung of claim 11, wherein the first support surface portion overhangs the first wall and a floor of the channel.

17. A ladder comprising:
a first assembly comprising:
a first pair of spaced apart rails, at least one rail of the first pair of spaced apart rails including a front flange and a rear flange;
a plurality of rungs extending between and coupled to the first pair of spaced apart rails, wherein at least one rung of the plurality of rungs includes a first support surface portion, a second support surface portion, and a channel extending between the first support surface portion and the second support surface portion, the channel having a floor portion positioned between a first rail of the first pair of spaced apart rails and a second rail of the first pair of spaced apart rails,
wherein a depth of the channel is positioned rearward of the front flange and the rear flange;
wherein the channel defines an opening spacing the first support surface portion and the second support surface portion apart from each other; and
wherein the channel is configured to allow insertion of a substantial portion of a distal phalanx of a user's hand to allow grasping the at least one rung.

18. The ladder of claim 17, wherein a front side wall of the channel is coplanar with the rear flange.

19. A ladder comprising:
a first assembly comprising:
a pair of spaced apart rails, wherein a rail depth is defined between a frontmost surface and a rearmost surface of at least one rail of the pair of spaced apart rails; and
a plurality of rungs extending between and coupled to the pair of spaced apart rails, wherein at least one rung of the plurality of rungs includes:
a first support surface portion having a first depth positioned in the rail depth,
a second support surface portion entirely external to the rail depth, and
a channel extending between and connecting the first support surface portion and the second support surface portion, at least partially positioned external to the rail depth, and defining an upward-facing opening between the first support surface portion and the second support surface portion, wherein the channel exhibits a height of at least 0.5 inch and a depth of at least 0.5 inch.

20. A rung for a ladder, the rung comprising:

a first support surface portion;

a second support surface portion; and a channel extending between the first support surface portion and the second support surface portion, wherein a first wall of the channel is planar, directly adjoins and extends below the first support surface portion, and is non-perpendicularly angled relative to the first support surface portion, wherein the first wall defines a plane, one side of the plane faces the entire first support surface portion, and an opposite side of the plane faces the entire second support surface portion;

wherein the channel comprises a second wall, and the channel defines an upward-facing opening between the first wall and the second wall; and wherein the channel exhibits a depth of at least approximately 0.5 inch and a height of at least one 0.5 inch.

21. A ladder comprising:

a first assembly comprising:

a first pair of spaced apart rails, at least one rail of the first pair of spaced apart rails including a front flange and a rear flange;

a plurality of rungs extending between and coupled to the first pair of spaced apart rails, wherein at least one rung of the plurality of rungs includes a first support surface portion, a second support surface portion, and a channel extending between the first support surface portion and the second support surface portion, the channel having a floor portion positioned between a first rail of the first pair of spaced apart rails and a second rail of the first pair of spaced apart rails, wherein a depth of the channel is positioned rearward of the front flange and the rear flange;

wherein the channel defines an opening spacing the first support surface portion and the second support surface portion apart from each other; and wherein the channel exhibits a depth of at least approximately 0.5 inch and a height of at least approximately 0.5 inch.

* * * * *